United States Patent Office 2,762,731
Patented Sept. 11, 1956

2,762,731

METHOD OF AND MATERIALS FOR PRODUCING PAINT BONDING FILMS ON FERRIFEROUS METAL SURFACES

Ferdinand P. Heller, Philadelphia, and Frank Palin Spruance, Jr., Ambler, Pa., assignors to American Chemical Paint Company, Ambler, Pa., a corporation of Delaware No Drawing. Application March 29, 1952,
Serial No. 279,466

6 Claims. (Cl. 148—6.2)

This invention relates to improved materials and to a method for producing a chemically formed film on ferriferous metal surfaces which film is particularly adapted to serve as a bonding surface for finishing coats of paint, varnish, lacquer, japan, waxes and the like.

This application is a continuation in part of our co-pending application No. 233,954 filed June 27, 1951, now abandoned.

The principal objects and advantages of the invention will be better understood if reference is first made to certain methods and solutions which are at present familiar to the art. For instance, in U. S. Patent 2,114,151 it has been suggested that ferriferous metal surfaces to which siccative finishing coats are to be applied should first be treated with an aqueous solution of chromic acid and a halogen or of chromic acid and a ferricyanide. Such solutions will produce on ferriferous metal surfaces a film which can serve as an excellent base for a final siccative coat but they are open to the objection that they tend to produce on the surface a "smut" or powder. Another example familiar to the prior art is that which is disclosed in U. S. Patent 2,276,353 where the use of the fluosilicate radical and chromic acid has been suggested as a suitable solution for preparing metallic surfaces to receive a final siccative coat. This process, however, involves the use of hot solutions and requires relatively long periods of time for the formation of the protective film.

The present invention resides in the discovery that ferriferous metal surfaces can be provided with a paint bonding film of exceptional merit if they are treated with an aqueous acid solution having a pH of at least 0.8 and not more than 5.5 and preferably between 1.5 and 5.0, which solution contains chromate radicals, chloride radicals and a complex fluoride radical from the class consisting of fluosilicate, fluoborate, fluozirconate, fluotitanate and fluostannate, within certain well defined limits as will further appear. We have found that such solutions may be operated over a very wide range of temperature and, in fact, that a satisfactory paint bonding film may be formed by use of solutions having a temperature as low as 40° F. However, such low temperatures are not essential and we prefer, in fact, to operate our solutions between 70–100° F. and normally not over 130° F., although it should be noted that, if desired, our improved process can be operated with solutions which have a temperature upwards of 150° F.

The principal objects of the invention are to provide a process and solutions for coating ferriferous metal surfaces which will overcome the difficulties incident to "smut"; which will produce a coating in a relatively short time so as to meet present day high speed programs; which are not critical as to temperature of operation; which are unusually tolerant insofar as the presence of foreign cation and anions are concerned; and which are relatively easily maintained in good operating condition.

In carrying out our improved process the surface to be treated should be clean but the cleaning procedure forms no part of the present invention and may be carried out by any conventional method familiar to the art. For example, grease and dirt may be removed by mild alkali cleaner or by the use of an emulsion cleaner or a vapor degreaser. Heat scale or corrosion products may be removed by acid cleaning.

The clean work to be treated by means of the present process need not be dried after the cleaning steps and may be dipped into the solution or the solution may be sprayed against the surface. In an immersion procedure we have found that treatment for as little as five seconds has been sufficient to form an excellent paint bonding film where the bath is operated at approximately 90° F. In spraying techniques even shorter times may be used if the entire surface is subjected to the impingement of the spray. If desired, longer treating times may be employed although when the temperature of the treating solution is around 90° F. we prefer not to treat for more than approximately 1½ minutes whether the solutions are used in dip or spray procedures.

As stated above, our invention employs aqueous acid solutions containing chromate (hexavalent chromium), chloride and certain complex fluoride radicals. The form in which these radicals are introduced seems to make little or no difference just as long as they remain in the solution in the correct proportion and just as long as the solution is maintained within the specified pH range. For example, the chromate may be introduced as chromic acid ($CrO_3$), potassium chromate or sodium chromate or dichromate, etc. The chloride may be introduced as common salt, ammonium chloride, hydrochloric acid, etc. The complex fluoride may be introduced in the form of any soluble complex fluoride, i. e., ammonium fluosilicate, sodium fluotitanate, ammonium fluozirconate or as complex fluorine acids, such as fluoboric acid, fluostannic acid, etc. Naturally the amount of acid which may have to be added will depend upon the form in which the essential coating producing radicals are introduced.

While in general the amount and quantity of foreign cations which may be present are not in themselves important except insofar as they may cause loss of the active radicals by precipitation of salt we prefer not to introduce any more foreign cations than is necessary. Among the cations which may be present in reasonable quantity without doing any harm are those of aluminum, zinc, copper, manganese, nickel, cobalt, calcium, iron and others.

The comments just made with respect to cations are equally applicable to foreign anions. These may be present in moderate quantities without causing any difficulty. Among the anions which may be present in relatively large amounts are nitrates, acetates, etc. but for optimum results we prefer not to have any phosphates or arsenates present.

Insofar as the essentials of our process and solutions are concerned, namely, pH, the presence of chromate, chloride and complex fluoride radicals, the region of concentration within which our solutions must be maintained for satisfactory operation are as follows:

1. The pH of the solution must be at least 0.8 and not more than 5.5. For optimum operation, the pH should be between 1.5 and 5.0. If the pH is lower than 0.8 or higher than 5.5, the paint-bonding quality of the produced film falls off sharply. Additionally, as the pH of a solution is raised above 5.5, there is a tendency for the bath to form an undesirable precipitate which is followed by a lowering of the pH value.

2. The chloride content of the treating solution calculated as ammonium chloride must be at least 0.05% and and as a practical maximum not more than 17%. If the concentration of the bath insofar as the chloride content is concerned is below 0.05%, it is difficult or impossible to form a paint bonding surface.

3. For each part of chloride calculated as ammonium chloride in the bath, there must be at least 0.5 part to 2.0 parts complex fluorides from the class consisting of fluosilicate, fluozirconate, fluoborate, fluotitanate, fluostannate, calculated as ammonium fluosilicate on a fluorine basis. Furthermore, the quantity of complex fluoride present as just specified must always be at least 0.025%, otherwise the metal will have a "smutty" coating formed thereon. Preferably, there should be at least 0.5% present in the bath.

4. Calculating the chloride and the complex fluorides present as ammonium salts, there is a very definite ratio of the chromate (calculated as $CrO_3$) to the total salts necessary for optimum operation of the bath. Considering the total salts calculated as ammonium salts (ammonium fluosilicate and ammonium chloride) as unity the ratio of chromate to "salts" should be between 0.03 and 5.0 and preferably between 0.05 and 1.5. Below the ratio of 0.03 it will be found that no protective film will be formed on the surface, and that as the ratio of 5.0 is approached and passed the paint bonding qualities of the film fall off very sharply.

A number of alternate bath formulas suitable for use in our process are given below. These are by way of illustration only and indicate a few of the many variations and compositions which may be employed within the operating ranges specified.

*Formula No. 1*

| | Grams |
|---|---|
| Chromic acid | 5 |
| Ammonium chloride | 5 |
| Ammonium fluosilicate | 5 |

Water to make 1 liter.

*Formula No. 2*

| | Grams |
|---|---|
| Ammonium chloride | 0.5 |
| Ammonium fluosilicate | 1 |
| Ammonium bichromate | 1 |

Water to make 100 mls.

*Formula No. 3*

| | Grams |
|---|---|
| Potassium chloride | 0.5 |
| Potassium fluosilicate | 0.5 |
| Potassium dichromate | 0.5 |

Water to make 100 mls.

*Formula No. 4*

| | Grams |
|---|---|
| Sodium chloride | 0.5 |
| Potassium fluosilicate | 0.5 |
| Chromic acid ($CrO_3$) | 0.5 |

Water to make 100 mls.

*Formula No. 5*

| | Grams |
|---|---|
| Potassium chloride | 0.5 |
| Potassium fluosilicate | 0.5 |
| Chromic acid ($CrO_3$) | 0.5 |

Water to make 100 mls.

*Formula No. 6*

Any of the above examples in which any other complex fluoride of the invention is substituted in equal amounts based on fluorine.

The treatment may be performed by immersing the surface to be coated in the solution, by flowing or spraying the solution upon the work or by other convenient techniques in which the solution is allowed to act upon the work. Such solutions are capable of forming an excellent paint-bonding film on the surface of the work after an immersion of 5 seconds, although longer immersion times may be employed. The temperature at which the solution is kept is not important, thus negating the necessity for external heat.

The pH's of the solutions above, when distilled water is used as a source of water, are pH 1.6; 4.6; 4.8; 1.7 and 1.7 respectively, thus clearly illustrating the wide range of pH in which our improved solutions may operate.

After the metallic surface has been treated with the process of our improved invention, it is normally rinsed, dried and painted. The rinsing may be either a rinse of water (ordinary tap), distilled water or the conventional mildly acidulated final rinses well known in the art. Where the maximum of paint-bonding ability is desired, we, of course, prefer the use of the mildly acidulated rinse of the prior art.

Although as previously stated our coating solutions can be prepared from a variety of starting substances, possibly the cheapest, simplest, and most easily available combination of chemicals from which to prepare them is sodium chloride, the ammonium salt of complex fluoride and chromic acid. Limits of composition within which the coating process is operative have been previously indicated. Although the exact maximum and minimum amounts of chloride content, complex fluoride content as well as the "total salt content" and dichromate content are difficult to specify aside from the previously given ratio for these materials it has been found generally that:

1. The soluble chromate content calculated as $CrO_3$ should lie between 0.25 and 450 grams per liter and preferably between 3 and 10 grams per liter.

2. The chloride content calculated as ammonium chloride should be between 0.5 and 100 grams per liter and preferably between 3 and 10 grams per liter.

3. The soluble complex fluoride content calculated on a fluorine basis as ammonium fluosilicate should be between 0.5 and 100 grams per liter and preferably between 3.0 and 10 grams per liter.

Of course, the actual amounts of the various chemicals chosen above should be within the ratios previously stated. When this is done, a good balance between economy and dragged out chemical is obtained in the preferred range just specified.

Since the essential ingredients of our improved coating solutions are soluble chromates, chlorides and complex fluorides, it has been found desirable, in making up and replenishing the solutions, to use concentrated admixtures which need only to be added to water or to acidified water to produce operative solutions of the proper composition. Such admixtures have the following advantages:

1. Only one chemical need be weighed or measured to make up the solution.

2. Shipping space and weight may be saved by the omission of all of the water from the admixture.

3. Errors in calculating and measuring the proportions of the ingredients are minimized since the proportions are originally fixed by the composition of the concentrated admixture which can be prepared and checked once and for all.

While the concentrated admixtures can be prepared either as liquids or as solids, we find it less desirable to prepare them as liquids because such liquids are extremely corrosive and tend to break down on prolonged storage with the liberation of chlorine. On the other hand, concentrated solid admixtures are eminently suitable for use with our invention since they constitute no storage problem insofar as stability of the actual chemicals themselves or their corrosiveness to shipping containers are concerned.

By way of example, for use in making up a fresh solution, the concentrated admixture may contain the ingredients in the following ratios assuming, of course, that they are all soluble in water:

| | Parts by weight |
|---|---|
| Chromate ($CrO_3$) | 1 |
| Complex fluorides of the invention (calculated as ammonium fluosilicate on a fluorine basis) | 1 |
| Chloride (calculated as ammonium chloride) | 1 |

The best compositions should contain for each part chromate (as $CrO_3$) 0.1 to 10 parts complex fluorides of the invention, calculated as ammonium fluosilicate on a fluorine basis and 0.1 to 10 parts chloride calculated as ammonium chloride.

The above admixtures may or may not be compounded to include free acid. The inclusion of acid is desirable from the standpoint of ease in preparing the actual coating solution, since nothing but water and the concentrated admixture is needed. Concentrated compositions may be made up as solutions, slurries or solids as previously stated. To get usable coating solutions, these need only be added to water or acidulated water if necessary. Preferred embodiments of our invention as regards concentrated admixtures embodying only easily obtainable chemicals are as follows:

Formula No. 7

| | Grams |
|---|---|
| Chromic acid ($CrO_3$) | 33⅓ |
| Ammonium fluosilicate | 33⅓ |
| Ammonium chloride | 33⅓ |

Formula No. 8

| | Grams |
|---|---|
| Ammonium chloride | 20 |
| Ammonium fluosilicate | 40 |
| Ammonium dichromate | 40 |

Formula No. 9

| | Grams |
|---|---|
| Sodium chloride | 33⅓ |
| Potassium fluosilicate | 33⅓ |
| Chromic acid | 33⅓ |

Formula No. 10

Substitute any of the corresponding complex fluorides of the invention.

The above formulas are illustrative of excellent solid concentrates which need only to be diluted with water in order to be ready for use. Variations of these concentrates within the general teachings above given will be plainly evident to those skilled in the art.

We claim:

1. The method of producing a paint-bonding surface on ferriferous metal surfaces which comprises treating the clean surface with a solution containing as its essential coating producing ingredients chloride, complex fluoride and chromate radicals, the complex fluoride being from the class consisting of fluosilicate, fluozirconate, fluoborate, fluotitanate and fluostannate (calculated as ammonium fluosilicate on a fluorine basis), the pH of the solution lying between 0.8 and 5.5 and the said ingredients being present in approximately the following amounts:

| | |
|---|---|
| Chloride (calculated as ammonium chloride). | 0.05% to 17% of the solution. |
| Complex fluoride (calculated as ammonium fluosilicate). | 0.5 part to 2.0 parts for each part of chloride but not less than 0.025% of the total solution. |
| Chromate (as $CrO_3$) | 0.03 to 5.0 times the amount of total chloride plus fluoride present calculated as ammonium salts. |

2. A method in accordance with claim 1 wherein the pH of the solution lies between 1.5 and 5.0; the complex fluoride content is not less than 0.5%; and the chromate to salt content in a ratio between 0.05 and 1.5.

3. The method of claim 1 wherein the temperature of the solution is held in a range between average living room temperature and 130° F.

4. An aqueous solution for producing a paint bonding surface on ferriferous metal surfaces the pH of which solution lies between 0.8 and 5.5 and the essential coating-producing ingredients of which solution consist of chloride, complex fluoride and chromate radicals, the complex fluoride being from the class consisting of fluosilicate, fluozirconate, fluoborate, fluotitanate and fluostannate (calculated as ammonium fluosilicate on a fluorine basis), and the said ingredients being present in approximately the following amounts:

| | |
|---|---|
| Chloride (calculated as ammonium chloride). | 0.05% to 17% of the solution. |
| Complex fluoride (calculated as ammonium fluosilicate). | 0.5 part to 2.0 parts for each part of chloride but not less than 0.025% of the total solution. |
| Chromate (as $CrO_3$) | 0.03 to 5.0 times the amount of total chloride plus fluoride present calculated as ammonium salts. |

5. A solution in accordance with claim 4 wherein the pH lies between 1.5 and 5.0, the complex fluoride content is not less than 0.5%, and the chromate to salt content lies in a ratio between 0.05 and 1.5.

6. A concentrated admixture for use in the method of claim 1 in which the essential coating-producing ingredients consist of the following in the proportions indicated:

| | |
|---|---|
| Chromate (as $CrO_3$) | 1 |
| Complex fluoride from the class consisting of fluosilicate, fluozirconate, fluoborate, fluotitanate and fluostannate (calculated as ammonium silico fluoride on a fluorine basis) | 0.1 to 10 |
| Chloride (calculated as ammonium chloride) | 0.1 to 10 | said ingredients being so compounded as to yield in solution a pH of between 0.8 and 5.5.

References Cited in the file of this patent

UNITED STATES PATENTS

| | | |
|---|---|---|
| 2,106,904 | Wilhelm | Feb. 1, 1938 |
| 2,114,151 | Romig | Apr. 12, 1938 |
| 2,228,836 | McQuaid | Jan. 14, 1941 |
| 2,276,353 | Thompson | Mar. 17, 1942 |
| 2,296,884 | Thompson | Sept. 29, 1942 |
| 2,499,231 | Stareck | Feb. 28, 1950 |

FOREIGN PATENTS

| | | |
|---|---|---|
| 632,090 | Great Britain | Nov. 16, 1949 |